United States Patent Office 3,573,236
Patented Mar. 30, 1971

3,573,236
PAPER COATING COMPOSITIONS AND METHOD
OF THEIR APPLICATION
David Osher Barlow, Wilmington, Del., assignor to E. I.
du Pont de Nemours and Company, Wilmington, Del.
No Drawing. Filed Feb. 8, 1968, Ser. No. 703,915
Int. Cl. C08d 7/08; C08f 45/06
U.S. Cl. 260—17
9 Claims

ABSTRACT OF THE DISCLOSURE

Papers coated with an aqueous dispersion containing, per 100 parts of pigment, 1 to 3 parts of polyvinyl alcohol, 7 to 12 parts of a synthetic polymer, 0.5 to 1.5 parts of glyoxal and 0.05 to 0.5 part of a water-retention aid, provided the ratio of polyvinyl alcohol to synthetic polymer is no greater than 0.35, have improved printability characteristics while the optical and strength properties are not adversely affected.

BACKGROUND OF INVENTION

Field of invention

This invention relates to aqueous coating compositions and to their application to paper webs.

Prior art

In the practice of preparing coated paper, it is customary to apply a pigmented coating composition to a paper web in order to render the paper suitable for subsequent printing operations. Heretofore, such coating compositions have basically comprised a combination of pigments and binders. Particular interest has recently been evident in providing coating compositions especially suitable for offset type printing. For example, U.S. Patent 3,298,987 issued to George P. Colgan and Joseph J. Latimer on Jan. 17, 1967, provides coating compositions with a variety of desirable properties. As therein set forth, compositions useful for coating papers having good optical and strength properties can be formulated by using as the clay binder system a combination of polyvinyl alcohol and a synthetic polymer dispersion such as styrene-butadiene in particular proportions. Also as therein disclosed, the use of glyoxal as a curing agent provides water resistance of the eventual coating.

While this patent discloses useful coating compositions for producing good coating strength and "wet rub" resistance, these compositions are not entirely satisfactory from a printability standpoint. This is because these formulations lack certain features which are needed to produce coated paper satisfactory for printing. These formulations, under coating conditions, lose water and the water-soluble binder, polyvinyl alcohol, in the direction of the substrate, paper or paperboard, at a rate such that there is an insufficiency of binder at the coating surface. The results of this are coatings having relatively porous printing surfaces.

Printability of the coated paper depends on the degree to which the printing ink is retained on the surface of the coated paper. This degree of retention can be measured by using two test procedures. The first of these measures the resistance of paper to printing ink and is reported as the percent K&N. More particularly, this test indicates the rate of absorption of printing ink at the surface of the paper. The second test procedure for measuring printability is termed the gloss ink hold-out test and measures the extent to which a printing ink will remain on the printing surface. While, as previously mentioned, the best available coating colors possess acceptable optical and strength properties, both the percent K&N values and the gloss ink hold-out of these colors is not completely satisfactory for producing coated paper having satisfactory printability features.

SUMMARY OF INVENTION

According to the present invention, there is provided an aqueous coating composition for application to a paper web comprising: 100 parts by weight of a mineral clay filler, 1 to 3 parts polyvinyl alcohol, 7 to 12 parts of a synthetic polymer, 0.5 to 1.5 parts of glyoxal and 0.05 to 0.5 part of a water-retention aid, all parts based on 100 parts of the mineral clay filler, the ratio of polyvinyl alcohol to synthetic polymer being no greater than 0.35 and the solids content of said composition being 35 to 65%.

There is also provided a method of providing a paper web with a film having good optical, strength and printability properties comprising: applying to the web an aqueous coating composition comprising 100 parts by weight of a mineral clay filler, 1 to 3 parts of polyvinyl alcohol, 7 to 12 parts of a synthetic polymer, 0.5 to 1.5 parts of glyoxal and 0.05 to 0.5 part of a water-retention aid, all parts based on 100 parts of the mineral clay filler, the ratio of polyvinyl alcohol to synthetic polymer being no greater than 0.35 and the solids content of the composition being 35 to 65%.

DETAILED DESCRIPTION OF INVENTION

While the individual materials that make up the present coating composition are well-known and available commercially, the combination of these materials in the proportions recited herein provides a coating on paper which not only possesses desirable printing characteristics, in addition to good strength and optional properties, but does so with less polyvinyl alcohol and at a higher solids content.

The polyvinyl alcohol employed is any of the commercially available polyvinyl alcohols produced by the alcoholysis of polyvinyl acetate. While all molecuar weights and degrees of hydrolysis of polyvinyl alcohol are useful in the present invention, particularly preferred polyvinyl alcohols are the super-hydrolyzed and fully hydrolyzed grades of polyvinyl alcohol. The super grade can have a degree of hydrolysis of 99.7 percent or higher and the fully hydrolyzed grade can have a percent hydrolysis of 99 percent or higher.

The filler employed can be any conventional coating clay used in the conventional manner including the hydrous aluminum silicates of kaolin group clays, hydrated silica clays and the clays recommended in "Kaolin Clays and Their Industrial Uses," 1949, J. M. Huber Corp., New York.

Besides clay, other filler materials can include titanium dioxide, calcium sulfate, calcium carbonate, zinc oxide, zinc sulfide, lithopone, blanc fixe or other pigments. These other fillers can be present up to about 40% by weight of the clay.

The synthetic polymer dispersion used in the present invention is one of the many well-known synthetic polymer dispersions previously used in coating paper. Such synthetic polymers include styrene-butadiene copolymer, particularly where the copolymer contains at least 25% styrene; acrylic polymers, particularly the lower alkyl acrylic esters; and polymers of vinyl acetate.

As a water-retention aid, there can be used such known materials as sodium carboxylmethyl cellulose, hydroxyethyl cellulose, methyl cellulose, sodium polyacrylate, casein and similar proteins, and sodium alginate.

The coating compositions can be prepared by any of several techniques known to those skilled in the art. The usual technique is to dissolve the polyvinyl alcohol in water, and then combine the resulting solution and the synthetic polymer latex with the filler along with the glyoxal and water-retention aid. To aid in the preparation of the compositions, small amounts of typical defoaming agent, surfactants and other ingredients can be employed.

The proportions of the ingredients are as set forth earlier; but, in all cases, the ratio of polyvinyl alcohol to synthetic polymer latex must not exceed 0.35 in order to obtain good printability along with optical and strength properties.

In coating paper, best results are obtained at as high solids content as possible. In the present invention, the solids content should be between 35 and 65%, and most preferably between 45 and 60%.

The coating composition is applied to the paper by any conventional method. Such methods include roll coaters, blade coaters, air knife coaters and draw-down coaters. In all cases after the coating composition is applied, it must be dried. Drying can be carried out by several means. The coatings may be dried on a series of heated rolls, or subjected to heated high velocity air. Combinations of these techniques are also used. In some cases, infrared drying is used in tandem with the other drying techniques.

The invention will be further illustrated by the following examples where parts are by weight unless otherwise indicated.

EXAMPLES 1-4

A pigment mixture was prepared by mixing 85 parts of clay, 10 parts of calcium carbonate, 5 parts of titanium dioxide and 0.25 part "Calgon" T (a phosphate dispersing agent made by Calgon Corp.) with 43 parts of water to yield a slurry containing 70% solids. The above mixture was mixed in a high-velocity, high-shear mixing device for 30 minutes. To this mixture was added 23 parts of water and 3 parts of polyvinyl alcohol ("Elvanol" 100-30, a superhydrolyzed polyvinyl alcohol which has a degree of hydrolysis greater than 99.8%). The temperature of the mixture was raised to 185–190° F. and held there accompanied by agitation for 15 minutes. At this point 0.5 part of a medium viscosity grade sodium carboxymethyl cellulose (R-75-M made by E. I. du Pont de Nemours and Company) was added and the heating period maintained for an additional 30 minutes. After cooling the mixture to about 125° F., 20 parts of a pigment-binding grade of styrene-butadiene dispersion (Dow Latex 620) was added followed by 0.3 part of glyoxal (supplied as a 40% solution by Union Carbide Co.). The coating mixture contains 60% solids.

This make-up procedure can be used to prepare coating mixtures with varying contents of polyvinyl alcohol, styrene-butadiene dispersion, and sodium carboxymethyl cellulose such as those shown in Table I.

These coating compositions were then applied to one side of 53-lb. prime-coated base stock by a trailing blade coater. Drying was effected by infrared heating elements. The applied coating weight was 6–8 lbs./ream. The coating was tested in the usual manner and the results shown in Table I were obtained.

TABLE I.—POLYVINYL ALCOHOL-STYRENE/BUTADIENE COATING COMPOSITIONS

| | Binder composition parts by wt. per 100 parts pigment | | | | Coating solids percent | Properties of coated paper | | | | | | | |
|---|---|---|---|---|---|---|---|---|---|---|---|---|---|
| Example | PVA | Latex solids | CMC | Glyoxal | | Gloss at 75° | Brightness, G.E. | Opacity | K&N percent | P.S.E. | Gloss ink hold-out | IGT pick [a] f.p.m. | Wet [b] rub |
| Control | 5 | 5 | 0.50 | 0.25 | 55 | 40 | 79.5 | 93 | 64 | 40 | 62 | 340 | 100 |
| 1 | 2 | 10 | 0.25 | 0.20 | 60 | 54 | 79.1 | 95 | 62 | 42 | 80 | 425 | 80 |
| Control | 2 | 10 | | 0.20 | 60 | 61 | 80.6 | 93 | 62 | 46 | 77 | 200 | 80 |
| 2 | 3 | 9 | 0.50 | 0.30 | 60 | 60 | 79.3 | 93 | 66 | 47 | 84 | 370 | 100 |
| Control | 3 | 9 | | 0.30 | 60 | 60 | 80.3 | 94 | 61 | 48 | 83 | 255 | 100 |
| 3 | 3 | 10 | 0.50 | 0.30 | 60 | 66 | 78.9 | 92 | 65 | 50 | 89 | 338 | 100 |
| Control | 3 | 10 | | 0.30 | 60 | 60 | 79.5 | 94 | 61 | 46 | 82 | 305 | 100 |
| 4 | 2 | 11 | 0.25 | 0.20 | 60 | 65 | 79.1 | 93 | 67 | 51 | 84 | 400 | 80 |
| Control | 2 | 11 | | 0.20 | 60 | 60 | 79.3 | 93 | 63 | 46 | 78 | 188 | 80 |

[a] No. 6 tack ink.
[b] Samples aged three weeks before testing.

Table I shows that the Control, even with a water-retention aid, at a ratio of polyvinyl alcohol to styrene-butadiene of 1.0 does not generally give as high an IGT Pick.

The specular gloss at 75 degrees was measured in accordance with TAPPI Standard T480m-51, the brightness with TAPPI Standard T452m-58 and the opacity with TAPPI Standard T425m-60. The resistance of the paper to printing ink (percent K&N) was measured in accordance with TAPPI Routine Control Method #RC19. The Paper Surface Efficiency (PSE) was determined in accordance with Graphic Arts Technical Foundation General No. 8 by the equation:

$$PSE = \frac{(1.33)(PG) + (A-33)}{2}$$

where:

PG = G.E. brightness of K&N ink smear
A = Gloss

The gloss ink hold-out values were obtained using a modification of the IGT pick test procedure. Orange Gloss Testing (International Printing Ink Co.) was used in this test. The ink is distributed on the apparatus normally used in TAPPI T499 su-64. A disc, 20 mm. wide was inked for one minute. Using the IGI Universal Printability Tester, the test paper was printed at 35 kg. pressure in the constant speed mode (1 meter/second). The test strips were allowed to dry overnight. Gloss readings were made in accordance with TAPPI 480m-5. The IGT Pick was measured by TAPPI Standard, Proposed New Suggested Method T499 su-64.

The web rub tests were made by placing the test paper over a sheet of black construction paper. A drop of water was placed on the paper near the bottom edge and allowed to stand 5 seconds. With moderate and steady pressure, the moistened area was stroked 2 times in a direction over the test sheet onto the construction paper. Another drop was placed next to the previous area and 4 finger strokes were made. This is continued until either 100 strokes are reached or obvious coating removal can be seen.

What is claimed is:
1. An aqueous coating composition for application to a paper web comprising 100 parts by weight of a mineral clay filler, 1 to 3 parts polyvinyl alcohol, 7 to 12 parts of a synthetic polymer selected from the group consisting of styrene-butadiene copolymers, lower alkyl acrylic esters and polymers of vinyl acetate, 0.5 to 1.5 parts of glyoxal and 0.05 to 0.5 part of a water-retention aid selected from the group consisting of carboxymethyl cellulose, hydroxyethyl cellulose, methyl cellulose, sodium polyacrylate, casein and sodium alginate, the ratio of polyvinyl alcohol to synthetic polymer being no greater than 0.35 and the solids content of said composition being 35 to 65%.

2. The coating composition of claim 1 wherein the water-retention aid is carboxymethyl cellulose.

3. The coating composition of claim 1 wherein the synthetic polymer is a styrene-butadiene copolymer.

4. The coating composition of claim 2 wherein the synthetic polymer is a styrene-butadiene copolymer.

5. The coating composition of claim 1 wherein the synthetic polymer is a lower alkyl acrylic ester.

6. The coating composition of claim 1 wherein the synthetic polymer is a vinyl acetate polymer.

7. A method of providing a paper web with a film having good optical, strength and printability properties comprising applying to the web an aqueous coating composition comprising 100 parts by weight of a mineral clay filler, 1 to 3 parts of polyvinyl alcohol, 7 to 12 parts of a synthetic polymer selected from the group consisting of styrene-butadiene copolymers, lower alkyl acrylic esters and polymers of vinyl acetate, 0.5 to 1.5 parts of glyoxal and 0.05 to 0.5 part of a water-retention aid selected from the group consisting of carboxymethyl cellulose, hydroxyethyl cellulose, methyl cellulose, sodium poly-acrylate, casein and sodium alginate, the ratio of polyvinyl alcohol to synthetic polymer being no greater than 0.35 and the solids content of the composition being 35 to 65%.

8. The method of claim 7 wherein the water-retention aid is carboxymethyl cellulose.

9. The method of claim 8 wherein the synthetic polymer is a styrene-butadiene copolymer.

References Cited

UNITED STATES PATENTS

| | | | |
|---|---|---|---|
| 2,662,040 | 12/1953 | Thomas | 260—29.7WA |
| 2,771,456 | 11/1956 | Konigsberg et al. | 260—29.6WA |
| 3,404,112 | 10/1968 | Lindemann et al. | 260—29.6WA |

WILLIAM H. SHORT, Primary Examiner

L. M. PHYNES, Assistant Examiner

U.S. Cl. X.R.

117—15, 60, 140, 155; 260—8, 17.4, 29.6, 41